3,486,651
HANDTRUCK ACCESSORY
John G. Gottinger, S. Hickory St., P.O. Box 668,
Fond Du Lac, Wis. 54935
Filed May 15, 1968, Ser. No. 729,311
Int. Cl. B62b *1/06*
U.S. Cl. 214—511        3 Claims

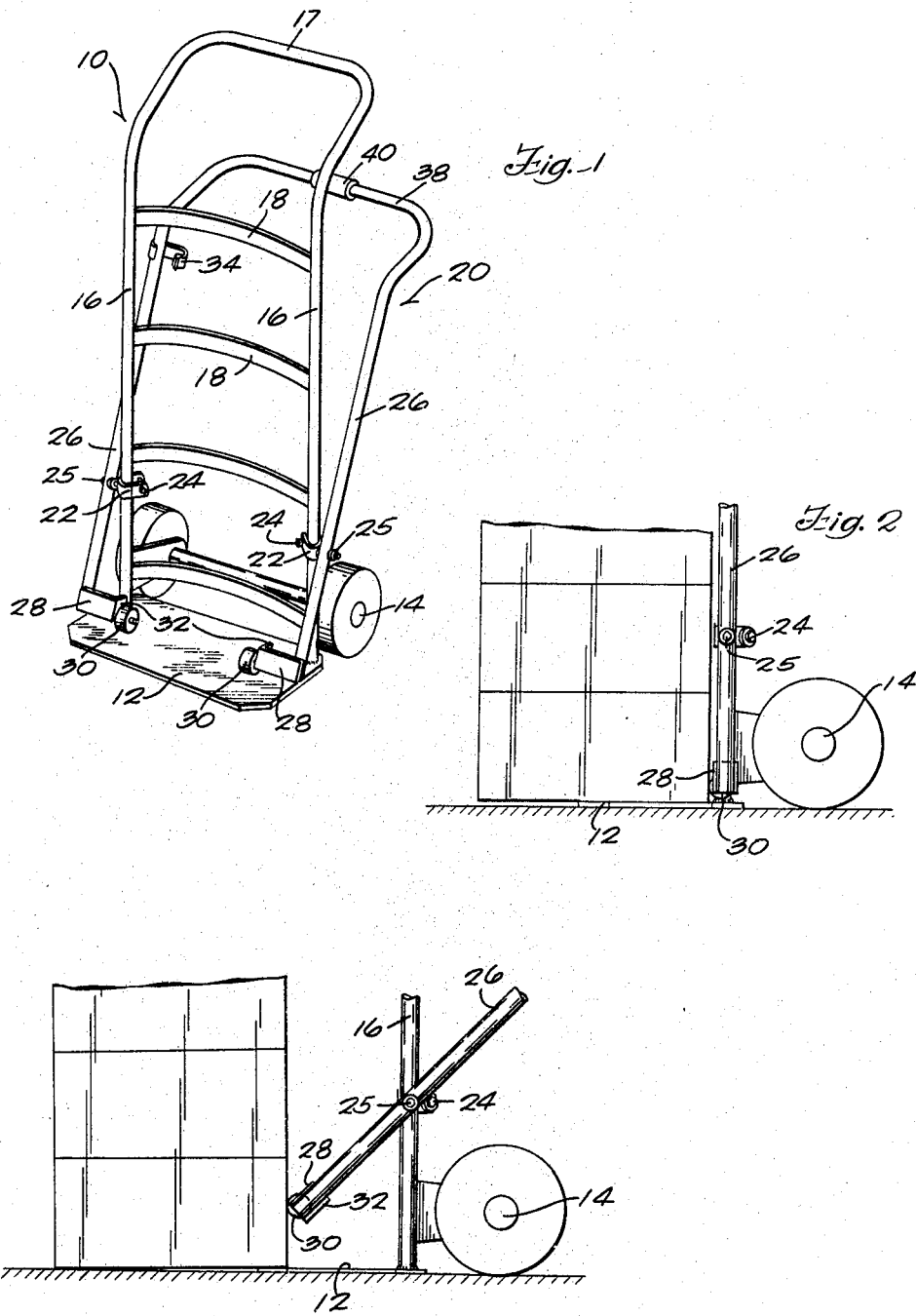

ABSTRACT OF THE DISCLOSURE

A U-shaped lever which is adapted to be pivotally connected to the upstanding frame members of a two wheel handtruck and which is provided with rollers at each lower end of its leg members. The lever may be pivoted from a generally upstanding position, at which time the rollers do not interfere with the load carried by the handtruck's platform, to a tilted position. During the pivoting, the rollers engage the load and permit easy separation of the load from the handtruck.

BACKGROUND OF INVENTION

The field of invention may be defined as material handling equipment and, specifically, as the two wheel handtruck art.

Prior to the present invention, several attempts have been made to provide a handtruck accessory which would ease the removal of the load from the platform of the handtruck. In most prior art devices, the accessory included a lever which was pivotally connected to the frame of the handtruck and which could be actuated to push the load off the truck's platform. For the reasons suggested below, it is believed that the prior art accessories did not meet the requirements of the handtruck industry and, therefore, did not attain commercial acceptance or success. First, most prior art devices did not lend themselves to ready attachment to hand trucks, but were intended to be made a permanent component of the handtruck at the time of the truck's manufacture. This shortcoming may be attributed to the fact that the prior art devices utilized the cross member of the truck's back frame as the hinge axle for the lever. Further, most prior art devices did not provide an accessory which would be equally well suited for rectangular objects, such as boxes, and cylindrical objects, such as barrels.

SUMMARY OF THE INVENTION

The inventive concept of the present invention resides in providing means for pivotally attaching the U-shaped lever to the upstanding frame members of the handtruck's back frame, as compared to utilizing the cross members of such frame for this purpose. This feature permits the lever to be removably attached to the handtruck and also does not limit the location of the attachment to a predetermined and fixed location. The obvious advantage of this feature is that the same lever may be used for various size handtrucks. The flexibility of the lever may be even further increased if the cross member or handle portion of the U-shaped lever is made adjustable as to its length. Such adjustment permits the width of the lever to be readily changed to thereby adapt the accessory for various width handtrucks.

Further, the inventive concept encompasses the idea of providing fairly small rollers at lower ends of each leg of the lever. The rollers are so designed that they are nested within the plane of the back frame whenever the lever is in the upstand position, and that the rollers engage the load as the lever is pivoted away from the upstanding position. Since the rollers are spaced apart and are located close to each side of the platform, they are equally effective in cases of a rectangular load as well as in cases of a cylindrical load.

DESCRIPTION OF THE DRAWINGS

FIG. 1 is a perspective view of a handtruck which is provided with the accessory which embodies the present invention;

FIG. 2 is a fragmentary side view of a handtruck at a time when the truck carries a load; and FIG. 3 is a view similar to that shown in FIG. 2 showing the parts in a position during the removal of the load from the handtruck.

Referring to the drawings, FIG. 1 shows a handtruck which is essentially comprised of a frame 10, a horizontally extending platform 12, and wheels 14. The frame 10 has upstanding tubular frame members 16, 16 which are interconnected at their upper end to form a handle portion 17. Slightly curved cross members 18 which are made of flat bar stock extend between the frame members 16 and are welded or otherwise permanently fixed to the frame members 16.

A U-shaped lever 20 is detachably connected to the frame 10 by two clamps 22, 22 which engage the tubular frame members 16, 16. Appropriate bolts 24 are provided to permit the clamps to be tightened at any preselected location. Each of the clamps carries an axle member 25 which extends through the corresponding leg member 26 of the lever 20. The end of each axle member is threaded and provided with a nut to thereby avoid unintentional separation of the clamp and axle components from the lever 20.

A small tab 28 is fixed to the lower end of each leg member 26 and small rollers 30 are rotatably fixed to an inwardly extending flange 32 of each tab. As shown, the periphery of the rollers extends slightly beyond the frontal face of the tabs.

The U-shaped lever 20 is normally maintained in the upstanding position by a clip 34 which resiliently engages one of the upstanding frame members 16 of the handtruck's frame. When the lever is in this position, the rollers 30 are nested within the frame 10, as shown in FIG. 2, and do not interfere with the load that may be carried on the platform 12.

When it is desired to remove the load from the platform, the lever 20 is pivoted away from the frame 10, as shown in FIG. 3. As the lever is pivoted the rollers engage and push against the load. If the load is fairly light, it is pushed off from the platform. If the load is heavy, as is true in most instances, the force exerted on the load causes the truck to slide out from the position below the load, which in most cases remains stationary.

If the U-shaped lever 20 is intended for use with various width handtrucks, the handle or cross member portion 38 of the lever may be comprised of two telescoping members which may be selectively adjusted, to the required width of the particular handtruck to which the lever is to be attached. In such cases, an appropriate threaded clamping collar 40, or a similar locking device of known design, may be provided.

Although but a single embodiment of the present invention has been illustrated and described, it will be apparent to those skilled in the art that various changes and modifications may be made therein without departing from the spirit of the invention.

I claim:
1. A handtruck accessory adapted to be attached to the back frame of a handtruck and operable to aid in the removal of a load from the platform and the handtruck said accessory comprising:
    a generally U-shaped lever having two elongated leg members which are interconnected at one of their ends by a cross member which forms the handle portion of the accessory, said U-shaped lever being generally as wide as the hand truck with which the accessory is intended to be used;

axle means on each of said leg members for pivotally supporting said U-shaped lever on upwardly extending frame members of the handtruck with which the accessory is used; and roller means provided at the other end of each of said leg members and adapted to engage the load which is carried by the platform of the handtruck and to move the load in respect to the hand truck upon pivotal movement of the accessory from a generally upstanding position to a tilted position, each of said roller means being comprised of a roller which is connected to the leg member for rotation around an axis which is generally parallel to the axis of said axle means, said rollers being of fairly narrow width, when compared to the width of said U-shaped lever, and the cylindrical face of said roller projecting slightly beyond the plane of said U-shaped lever.

2. A handtruck according to claim 1 wherein said U-shaped lever is adapted to be attached to the upwardly extending frame members in such a manner that said upwardly extending frame members are located between said leg members of said lever, and wherein said accessory is provided with roller carrying means which positions said rollers inwardly in respect to said leg members and positions the axis of rotation of said rollers slightly in back of the frontal face of said U-shaped lever.

3. A handtruck according to claim 2 including adjustment means for varying the width of said U-shaped lever to thereby render the accessory adaptable for handtrucks of various widths.

References Cited

UNITED STATES PATENTS

| 2,682,348 | 6/1954 | Stumphauzer | 214—511 |
| 2,953,267 | 9/1960 | Gorman | 214—511 |
| 2,978,127 | 4/1961 | Gorman | 214—511 |
| 3,403,800 | 10/1968 | Botello | 214—511 |

ALBERT J. MAKAY, Primary Examiner

U.S. Cl. X.R.

214—370